US008775436B1

(12) United States Patent
Zhou et al.

(10) Patent No.: US 8,775,436 B1
(45) Date of Patent: Jul. 8, 2014

(54) IMAGE SELECTION FOR NEWS SEARCH

(75) Inventors: Hong Zhou, Sunnyvale, CA (US);
Srdjan Mitrovic, Redwood City, CA (US); Krishna Bharat, San Jose, CA (US); Michael Schmitt, Zurich (CH); Michael Curtiss, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 608 days.

(21) Appl. No.: 12/195,167

(22) Filed: Aug. 20, 2008

Related U.S. Application Data

(63) Continuation of application No. 10/804,180, filed on Mar. 19, 2004, now abandoned.

(51) Int. Cl.
*G06F 17/30* (2006.01)

(52) U.S. Cl.
USPC .......................................................... 707/748

(58) Field of Classification Search
CPC ................................................ G06F 17/30864
USPC .................................. 707/723, 731, 737, 748
See application file for complete search history.

(56) References Cited

U.S. PATENT DOCUMENTS

| | | | | |
|---|---|---|---|---|
| 5,546,572 A * | 8/1996 | Seto et al. | ...................... | 395/600 |
| 5,886,698 A * | 3/1999 | Sciammarella et al. | ....... | 715/769 |
| 5,893,908 A | 4/1999 | Cullen et al. | | |
| 5,963,659 A * | 10/1999 | Cahill et al. | ................... | 382/139 |
| 5,970,183 A * | 10/1999 | Amemiya et al. | ............ | 382/282 |
| 6,169,998 B1 * | 1/2001 | Iwasaki et al. | ................ | 715/202 |
| 6,922,700 B1 * | 7/2005 | Aggarwal et al. | ............. | 707/104 |
| 7,031,968 B2 | 4/2006 | Kremer et al. | | |
| 7,214,065 B2 * | 5/2007 | Fitzsimmons, Jr. | ........... | 434/236 |
| 7,333,984 B2 | 2/2008 | Oosta | | |
| 7,382,903 B2 * | 6/2008 | Ray | ............................... | 382/118 |
| 7,580,568 B1 * | 8/2009 | Wang et al. | ................... | 382/173 |
| 2001/0011365 A1 | 8/2001 | Helfman | | |
| 2002/0038299 A1 * | 3/2002 | Zernik et al. | ..................... | 707/3 |
| 2002/0107847 A1 | 8/2002 | Johnson | | |
| 2003/0046315 A1 * | 3/2003 | Feig | .......................... | 707/512 |
| 2003/0055810 A1 * | 3/2003 | Cragun et al. | .................... | 707/1 |
| 2004/0015517 A1 | 1/2004 | Park et al. | | |

(Continued)

FOREIGN PATENT DOCUMENTS

EP          48568 A2 *    3/1982

OTHER PUBLICATIONS

Charles Frankel, Michael J. Swain, and Vassilis Athitsos, "WebSeer: An Image Search Engine for the World Wide Web", Aug. 1, 1996, The University of Chicago Computer Science Department Technical Report 96-14. p. 3, Bullet Items 2 and 3.*

(Continued)

*Primary Examiner* — James Trujillo
*Assistant Examiner* — Soheila Davanlou
(74) *Attorney, Agent, or Firm* — Harrity & Harrity, LLP

(57) ABSTRACT

A system identifies a first document that includes a number of first images, identifies a second document that includes a number of second images, and forms a cluster based on a relationship between the first document and the second document. The system identifies a first caption associated with one of the first images, identifies a second caption associated with one of the second images, selects the one of the first images or the one of the second images as a representative image for the cluster based on the first caption or the second caption, and associates the representative image with the cluster.

36 Claims, 8 Drawing Sheets

(56) References Cited

U.S. PATENT DOCUMENTS

| | | |
|---|---|---|
| 2004/0019601 A1* | 1/2004 | Gates .......................... 707/102 |
| 2005/0022106 A1* | 1/2005 | Kawai et al. ................. 715/500 |
| 2005/0050150 A1* | 3/2005 | Dinkin ......................... 709/207 |
| 2005/0080769 A1* | 4/2005 | Gemmell et al. ................. 707/3 |
| 2006/0004717 A1* | 1/2006 | Ramarathnam et al. .......... 707/3 |
| 2009/0076797 A1* | 3/2009 | Yu ..................................... 704/9 |

OTHER PUBLICATIONS

WebSeer: An Image Search Engine for the World Wide Web, Charles Frankel, Michael J. Swain, and Vassilis Athitsos, Aug. 1, 1996 Abstract.*

Wynblatt et al. ("Web Page Caricatures: Multimedia Summaries for WWW Documents," IEEE Proc. Int'l Conf. on Multimedia Computing and Systems, Jun. 22-Jul. 1, 1998, pp. 194-199).

Frankel et al. ("WebSeer: An Image Search Engine for the World Wide Web," The University of Chicago, Computer Science Dept., TR 96-14, Aug. 1, 1996).

Brown et al. ("CWIC: Continuous Web Image Collector," Proceedings of ACM 38$^{th}$ Southwest Regional Conference, 2000, pp. 244-252).

Helfman et al. ("Image Representation for Accessing and Organizing Web Information." Proc. SPIE vol. 4311 (2001)).

Baidu; www.baidu.com; Jun. 21, 2004 (print date); 8 pages.

Hong Zhou et al. "Image Selection for News Search"; U.S. Appl. No. 10/804,180, filed Mar. 19, 2004, 37 pages.

* cited by examiner

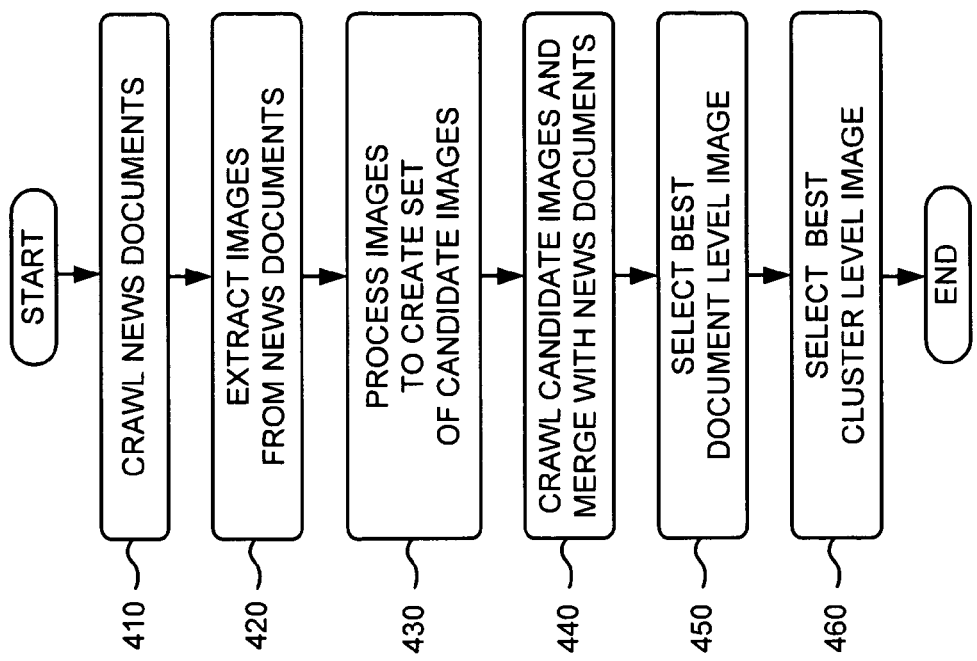

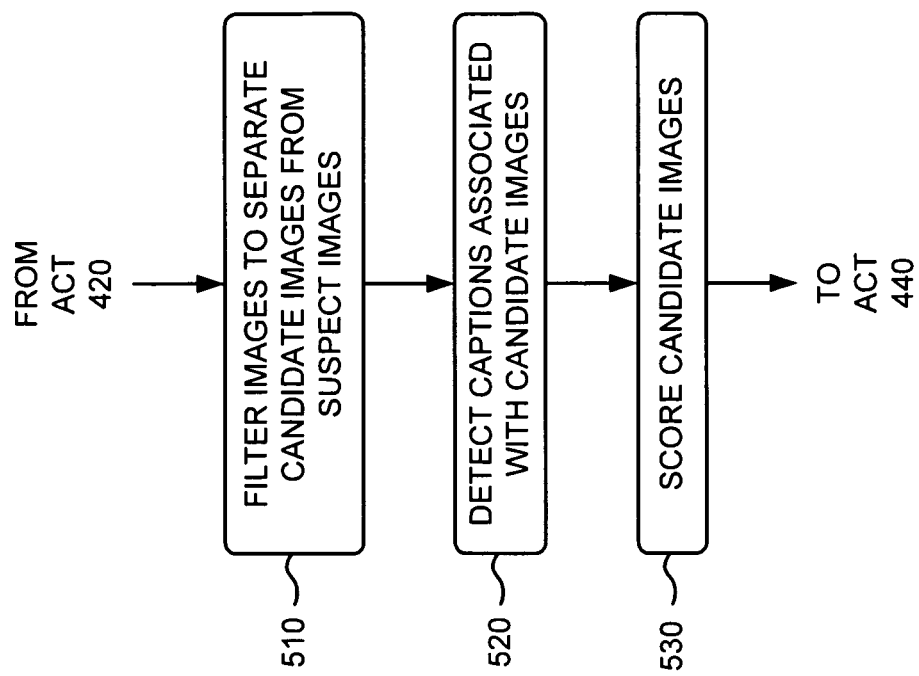

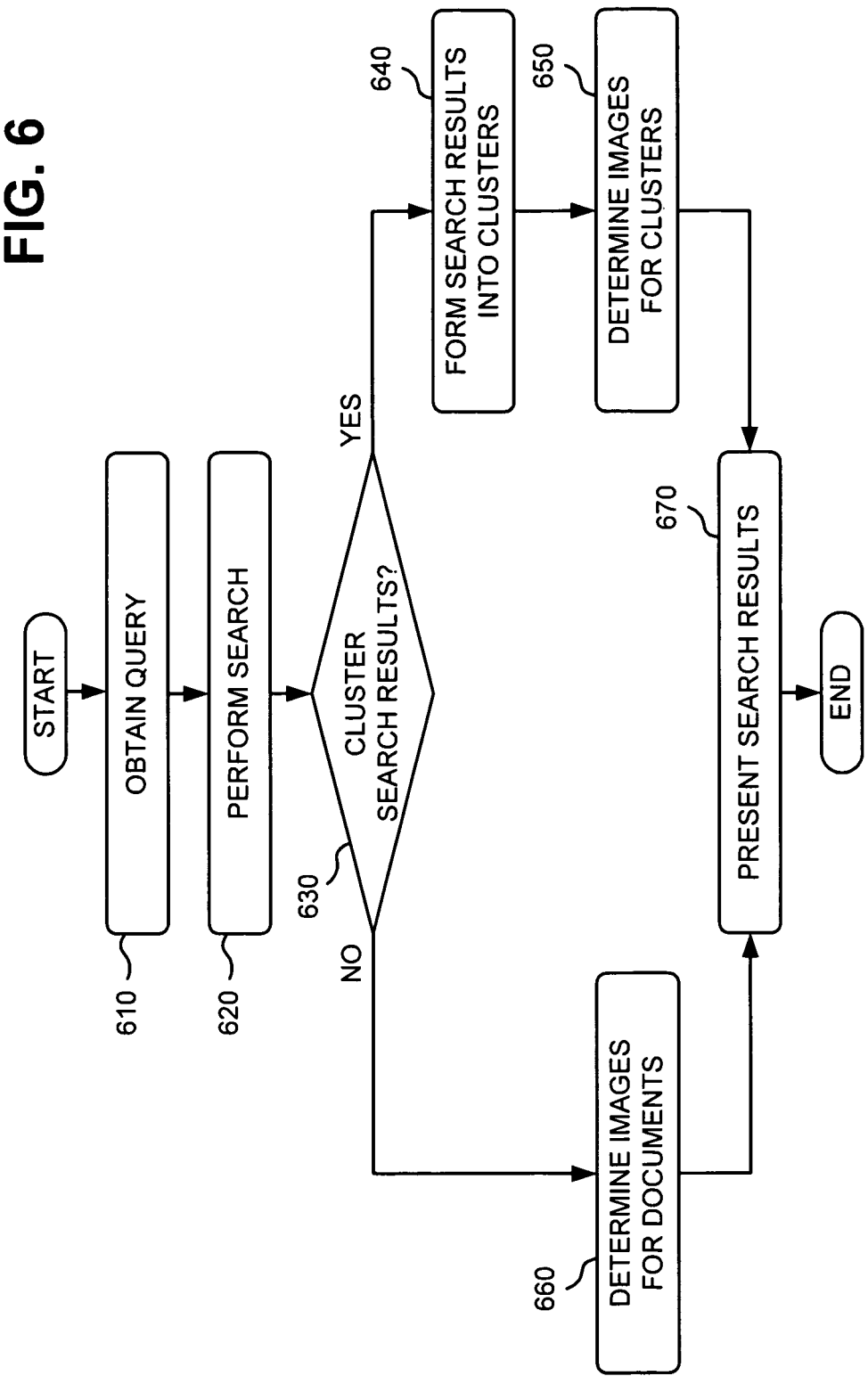

Google News BETA bush | [SEARCH NEWS]

SEARCHED NEWS FOR BUSH
___

Kerry Strikes Back at Bush on Ads — 710
CNN - 1 hour ago — 720
John Kerry's campaign released an ad Friday accusing
Bush of "misleading America" about Kerry's record. The
30-second . . . — 730

CNN
    Bush Camp Launches Anti-Kerry Ads - FOX News — 740
    Ad Wars: Bush Goes Negative - WCCO
750    MSNBC - New York Times - and more >>

760

Analysis: Bush Goes Negative
United Press International - 1 hour ago
WASHINGTON, March 12 (UPI) -- President George W.
Bush is going down and dirty, head-to-head with Sen.
John Kerry in their ad war . . . .

Washington
  Post
    Defensively Going on the Offensive - Washington Post
    Kerry Cements His Role as a Unifying Figure - Fort Worth Star Telegram
    OSU Daily Barometer - Washington Times - and more >>

FIG. 7

IMAGE SELECTION FOR NEWS SEARCH

RELATED APPLICATION

This application is a continuation of U.S. patent application Ser. No. 10/804,180, filed Mar. 19, 2004, the disclosure of which is incorporated herein by reference.

BACKGROUND OF THE INVENTION

1. Field of the Invention

Systems and methods consistent with the principles of the invention relate generally to information retrieval and, more particularly, to selecting an image to present in connection with search results relating to a news search.

2. Description of Related Art

The World Wide Web ("web") contains a vast amount of information. Search engines assist users in locating desired portions of this information by cataloging web documents. Typically, in response to a user's request, a search engine returns links to documents relevant to the request.

Search engines may base their determination of the user's interest on search terms (called a search query) provided by the user. The goal of a search engine is to identify links to relevant results based on the search query. Typically, the search engine accomplishes this by matching the terms in the search query to a corpus of pre-stored web documents. Web documents that contain the user's search terms are considered "hits" and are returned to the user.

In the case of news documents, users may find it beneficial to see an image in association with the news documents. Oftentimes, however, news documents include multiple images some of which may not be related to the topic of the news documents. This makes it difficult to automatically select appropriate images for the news documents.

SUMMARY OF THE INVENTION

According to one aspect consistent with the principles of the invention, a method includes identifying images associated with a document, filtering the images to create a set of candidate images, detecting captions associated with the candidate images, and selecting one of the candidate images to associate with the document based on the detected captions.

According to another aspect, a graphical user interface for display on a computer includes a search result comprising a cluster of news documents and an image associated with the cluster.

According to yet another aspect, a graphical user interface for display on a computer includes a search result comprising a news document and an image associated with the news document.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 4 is a flowchart of exemplary processing for selecting an image according to an implementation consistent with the principles of the invention;

FIG. 5 is a flowchart of exemplary processing to create the set of candidate images according to an implementation consistent with the principles of the invention;

FIG. 6 is a flowchart of exemplary processing for providing search results according to an implementation consistent with the principles of the invention;

FIG. 7 is a diagram of an exemplary graphical user interface that presents search results as a list of clusters according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

Overview

Users who search news documents on a network, such as the Internet, may find it beneficial to view images that are associated with the news documents. Systems and methods consistent with the principles of the invention may provide images in association with news documents or clusters of news documents. The systems and methods may select the best image from a group of images to display in connection with a particular news document or cluster.

Exemplary Network Configuration

Figure 1:
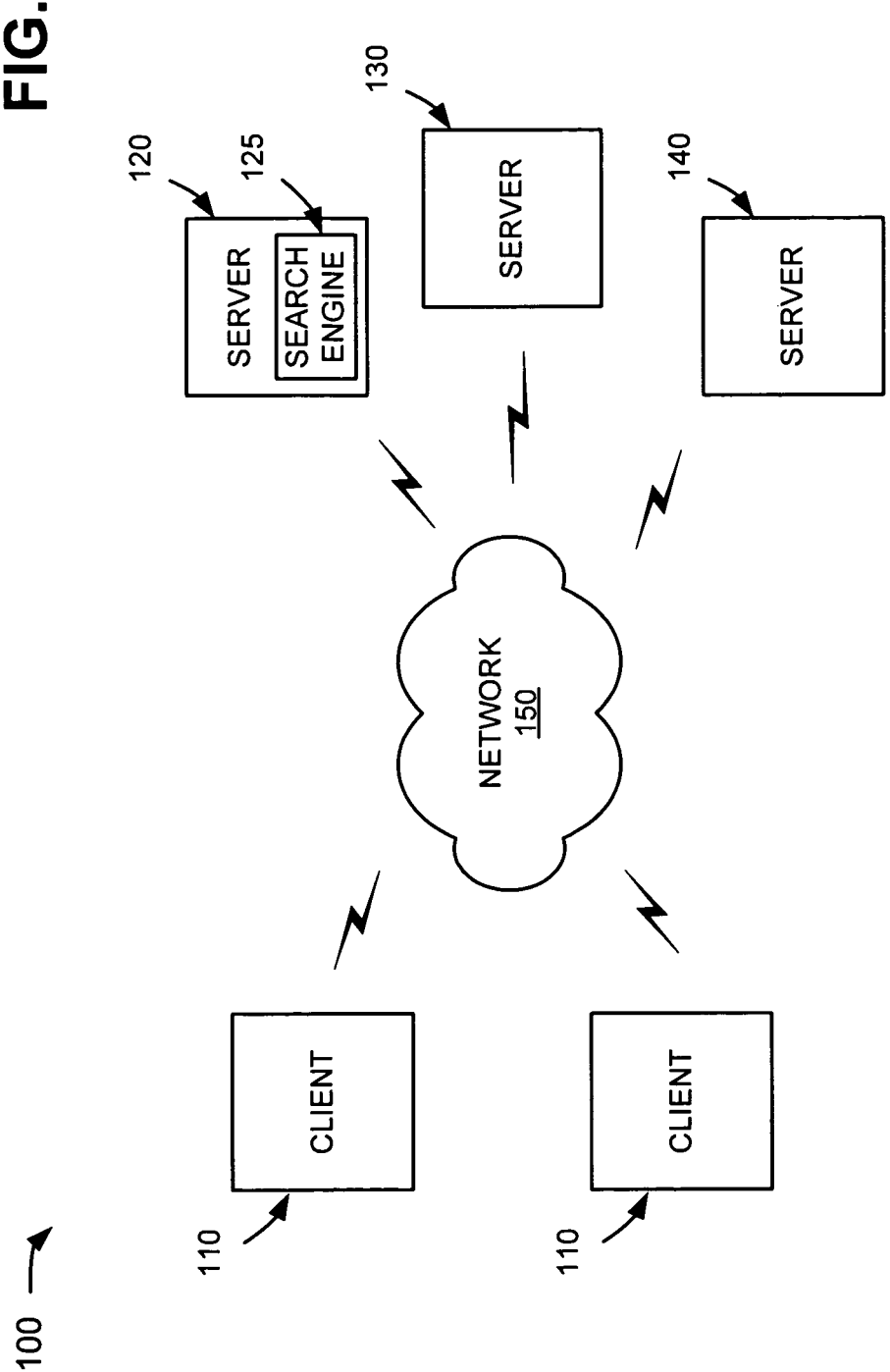
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-140 via a network 150. Network 150 may include a local area network (LAN), a wide area network (WAN), a telephone network, such as the Public Switched Telephone Network (PSTN), an intranet, the Internet, a memory device, another type of network, or a combination of networks. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Servers 120-140 may include server entities that gather, process, search, and/or maintain documents in a manner consistent with the principles of the invention. Clients 110 and servers 120-140 may connect to network 150 via wired, wireless, and/or optical connections.

In an implementation consistent with the principles of the invention, server 120 may include a search engine 125 usable by clients 110. Server 120 may crawl a corpus of documents (e.g., web pages), index the documents, and store information associated with the documents in a repository of crawled documents. Servers 130 and 140 may store or maintain documents that may be crawled by server 120. While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible for a single one of servers 120-140 to be implemented as two or more separate (and possibly distributed) devices.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to or from a document.

Exemplary Client/Server Architecture

Figure 2:
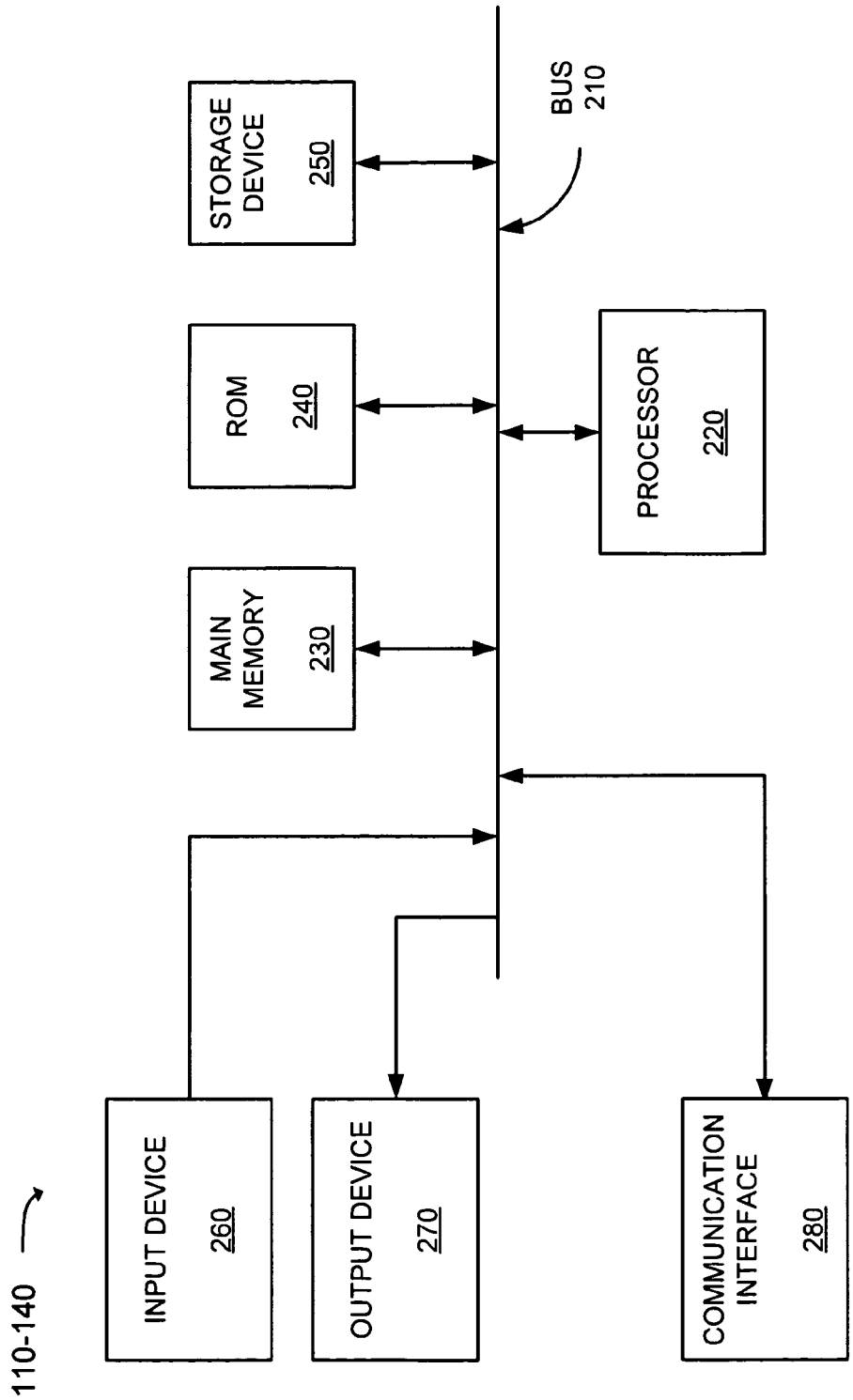
FIG. 2 is an exemplary diagram of a client and/or server of FIG. 1 according to an implementation consistent with the principles of the invention.

FIG. 2 is an exemplary diagram of a client or server entity (hereinafter called "client/server entity"), which may correspond to one or more of clients 110 and servers 120-140, according to an implementation consistent with the principles of the invention. The client/server entity may include a bus 210, a processor 220, a main memory 230, a read only memory (ROM) 240, a storage device 250, an input device 260, an output device 270, and a communication interface 280. Bus 210 may include a set of conductors that permit communication among the elements of the client/server entity.

Processor 220 may include a conventional processor, microprocessor, or processing logic that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include a conventional mechanism that permits an operator to input information to the client/server entity, such as a keyboard, a mouse, a pen, voice recognition and/or biometric mechanisms, etc. Output device 270 may include a conventional mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity, consistent with the principles of the invention, perform certain searching-related operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Server

Figure 3:
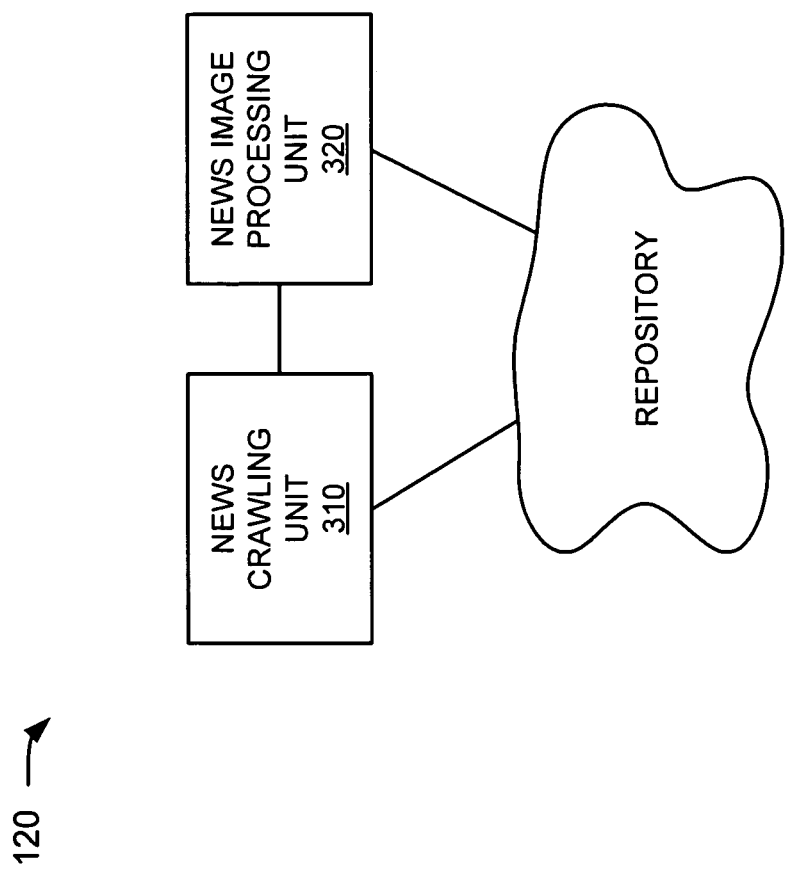
FIG. 3 is an exemplary functional block diagram of a portion of a server of FIG. 1 according to an implementation consistent with the principles of the invention.

FIG. 3 is an exemplary functional block diagram of a portion of server 120 according to an implementation consistent with the principles of the invention. According to one implementation, one or more of the functions described below may be performed by search engine 125. According to another implementation, one or more of these functions may be performed by an entity external to server 120, such as a computer associated with server 120 or one of servers 130 and 140.

Server 120 may include a news crawling unit 310 and a news image processing unit 320 connected to a repository. The repository may include information associated with documents that were crawled and stored by, for example, news crawling unit 310. The repository may also store images associated with these documents either together with the documents or separate therefrom.

News crawling unit 310 may crawl a corpus of documents, such as the Internet, to identify news documents. For example, news crawling unit 310 may start with a set of addresses (e.g., uniform resource locators (URLs)), such as addresses associated with a set of news sources, and parse the documents associated with these addresses to identify links to other documents. News crawling unit 310 may then parse these other documents to identify links to yet other documents, and so on. News crawling unit 310 may use this information to fetch and index the news documents.

News crawling unit 310 may then extract addresses associated with candidate images from each of the crawled documents. For example, news crawling unit 310 may extract addresses (e.g., URLs) of all images from each of the crawled documents. For each image, news crawling unit 310 may store its associated address and other data, such as the image dimension, the parent addresses (e.g., URLs), the date on which the image was crawled, and the date on which the image was last modified. This "other" data may be determined from information, such as hypertext markup language (HTML) tags, in the source document (i.e., the document from which the image originated).

News crawling unit 310 may also crawl the images based on their extracted addresses and store the images and other information relating to the images. For example, news crawling unit 310 may obtain temporal information and reference count information relating to the images. The temporal information may be useful for identifying "stock images" (i.e., images that are used in multiple news documents relating to the same topic). Stock images may qualify as good candidate images. The reference count information may be useful for identifying images that are linked by multiple news documents on the same host but not directly related to the topics of the news documents, such as images of columnists or news source related icons. Images with high reference counts may be determined to not make good candidate images.

News image processing unit 320 may process the images before and/or after the images are crawled by news crawling unit 310. For example, news image processing unit 320 may identify an initial set of candidate images from the images identified by news crawling unit 310. News image processing unit 320 may filter the set of candidate images based on additional information obtained by news crawling unit 310 during the image crawl.

News image processing unit 320 may select an image from the set of candidate images to associate with a particular news document or a particular cluster of news documents. The particular processing involved in selecting an image will be described in detail below. News image processing unit 320 may store an index that relates the candidate images to the news documents to which they have been associated.

Exemplary Image Selection Processing

FIG. 4 is a flowchart of exemplary processing for selecting an image according to an implementation consistent with the principles of the invention. Processing may begin with crawling a corpus of documents to identify news documents (act 410). The crawling may start with a set of addresses, such as addresses associated with a set of news sources, and parse the documents associated with these addresses to identify links to other documents. These other documents may then be parsed to identify links to yet other documents, and so on. The news documents may then be fetched and indexed.

Addresses of the images in each of the crawled documents may be identified and extracted (act 420). For each image, the associated address and other data, such as the image dimension, the parent addresses (e.g., URLs), the date on which the image was crawled, and the date on which the image was last modified, may be stored.

The images may then be processed to create a set of candidate images (act 430). FIG. 5 is a flowchart of exemplary processing to create the set of candidate images according to an implementation consistent with the principles of the invention. Processing may begin with filtering the images to separate images that are good candidates to associate with news documents or clusters from suspect images that are not good candidates to be associated with any news document or cluster. Examples of candidate images may include images relating to a topic of the news documents or clusters. Examples of suspect images may include images corresponding to advertisements or columnists, images that are irregularly shaped, images with an irregular format, and images that are unrelated to the topic of the source news documents. Suspect images may be removed from further processing.

As described below, one or a combination of various filtering rules, criteria and thresholds may be used to select one or more candidate images. It should be appreciated, however, that aspects of the invention are not limited to any one or a combination of these filtering rules, criteria, or thresholds. Those skilled in the art will recognize from this description of exemplary embodiments that various modifications and alternative implementations are possible.

One exemplary filtering rule may separate candidate images from suspect images based on the shape of the images. For example, a candidate image should not have an irregular shape. Both dimensions of the candidate image should exceed a particular threshold (e.g., 60 pixels). An image with a dimension below the threshold may be identified as a suspect image. Also, a candidate image should have a moderate aspect ratio (e.g., no more than 3:1 or 1:3). In other words, the image should not be too narrow or too tall. A threshold may be used to distinguish acceptable from unacceptable aspect ratios. An image with an aspect ratio below the threshold may be identified as a suspect image.

Another exemplary filtering rule may separate candidate images from suspect images based on their file formats. For example, a candidate image should have a proper image file format, such as the joint photographic experts group (jpeg) format, graphic interchange format (gif) format, tagged image file format (tiff) format, portable document format (pdf) format, bitmap (bmp) format, portable network graphics (png) format, and possibly other common image formats. Images that include formats that are not considered proper image file formats may be identified as suspect images.

Yet another exemplary filtering rule may separate candidate images from suspect images based on whether they include links. For example, a candidate image should not include a link, such that if the image is clicked it will lead to a document with which it is associated. Images that include links are often advertisements and, therefore, may be identified as suspect images.

A further exemplary filtering rule may separate candidate images from suspect images based on where the images are hosted. For example, a candidate image should be hosted by the same organization that hosted the source news document. Images from different domains (e.g., cnn.co.jp.com), but associated with the same organization (e.g., cnn.com), may be identified as candidate images. Images from other organizations tend to be advertisements and, therefore, may be identified as suspect images.

There may be exceptions to these rules. Accordingly, good and bad lists may be formed. The good list may include information regarding images from third party cache services, such as Akamai, that may have file formats that are not considered proper file formats and images that include a link (or perhaps sources for which images with a link may be accepted). Images associated with the good list may be identified as candidate images. The bad list may include information regarding news sources that do not want their images shown and suspect images that have, for one reason or another, been previously identified as candidate images.

Image captions associated with the candidate images may be detected (act 520). An image caption may provide the best description of an image. It may also indicate whether the image is related to the topic of the source news document.

When parsing the news documents, information regarding the content of the news documents and the images may be recorded. For example, in the case of HTML documents, runs of continuous text within HTML tags may be collected together and called "text runs." Each text run and each image may be labeled with the associated HTML table identifier and the HTML table cell identifier, if applicable. In addition, the alternative text for each image may also be recorded. The alternative text for an image may provide a textual alternative to the purpose of the image and may be displayed when the image is not being displayed.

For each image, the alternative text, when present, may be examined. The alternative text may be analyzed to determine whether it contains "poison" words, such as words identifying the author of the image or other words unrelated to the topic of the corresponding news document. When the alternative text does not contain poison words, it may be used as the caption of the image.

When the image does not include alternative text or it is determined that the alternative text should not be used as the image caption, it may be determined whether the image is located within a table. If the image is not located in a table, then the image may be identified as having no image caption because of the ambiguity between the image caption and the body of the news document. If the image is located in a table, however, then the text runs that are within the same table cell as the image may be considered as a candidate for the image caption. If there are no text runs within the same table cell as the image, then the text runs in the neighboring table cell (within a certain cell distance) may be considered as a candidate for the image caption.

When determining whether to use an image caption candidate as the image caption, it may be determined whether the number of candidate text runs exceeds a threshold. For example, when the number of candidate text runs exceeds the threshold, there is a chance that these text runs are not associated with the image, but instead are part of the body of the news document. In this case, the text runs may not be used as the image caption.

It may also be determined whether the candidate text runs are too bulky. For example, the average length of the text runs and/or the largest length of the text runs may be analyzed to determine whether they are below a certain threshold. When the average length of the text runs and/or the largest length of the text runs exceed the threshold, there is a chance that these text runs are not associated with the image, but instead are part of the body of the news document. In this case, the text runs may not be used as the image caption.

An image score may be generated for each candidate image (act 530). In one implementation, the score is based on one or more factors from the group including the image size, a distance to the title of the news document, and an overlap between the image caption and the news document centroid (i.e., the collection of words most representative of the news document).

With regard to the first factor, the relative size of an image in terms of area with respect to the largest image size for the same source document may be determined and used as a scoring factor. For an HTML document, the image size may be determined from the "img" tag associated with the image. If there is no img tag in the document, then the image may receive a zero score for this factor. With regard to the second factor, the distance from the title of the document to the image may be determined. The larger this distance is the more likely that the image is not related to the topic of the document. With regard to the third factor, it may be determined how many times the words in the image caption appear in the body of the document. The more hits the image caption has in the body of the document, the more likely that the image is related to a topic of the document. In other implementations, other techniques may be used to determine whether the image caption is related to a topic of the document.

In one implementation, these factors are used to generate a score for an image. According to one exemplary implementation, an image score may be determined as follows:

Image Score=$C\_size$*(relative size of the image)+$C\_title\_distance$/(distance from title)+$C\_centroid\_hit$*(number of document centroid hits), where $C\_size$ may refer to a coefficient associated with the size factor, $C\_title\_distance$ may refer to a coefficient associated with the distance-from-title factor, and $C\_centroid\_hit$ may refer to a coefficient associated with the centroid hit factor.

The candidate images may be stored in a log file with their corresponding source documents. In one implementation, the candidate images are sorted by their scores in descending order. This log file may permit the images that are later returned by a crawl to be merged with their corresponding source documents.

Returning to FIG. 4, the addresses of the candidate images may be used to crawl the images (act 440). For example, the candidate images may be fetched and merged with their corresponding source documents in the log file (act 440).

The best document level image may then be selected (act 450). According to one implementation, the best document level image is selected after the crawl because some candidate images may not be reachable and dimension information may not be known for some candidate images prior to the crawl. Unreachable candidate images may be discarded. For example, a predefined timeout period may be set for the image crawl. If a candidate image is unreachable at the end of this timeout period, then it may be discarded.

The dimension of each candidate image that was successfully fetched during the crawl may be analyzed again. A candidate image that has an irregular shape may be discarded. As described above, both dimensions of the candidate image should exceed a particular threshold (e.g., 60 pixels). A candidate image with a dimension below the threshold may be discarded. Also, a candidate image that does not have a moderate aspect ratio (e.g., no more than 3:1 or 1:3) may be discarded. In other words, the candidate image should not be too narrow or too tall. As described above, a threshold may be used to distinguish acceptable from unacceptable aspect ratios. A candidate image with an aspect ratio below the threshold may be discarded.

An image histogram of reference counts may also be constructed to filter out columnist images and news source related icons. The histogram may be useful for identifying images that are linked by multiple news documents on the same host but not directly related to the topics of the news documents, such as columnist images and news source related icons. Candidate images with high reference counts may be discarded.

Additional filtering rules may be used to further filter the candidate images. For example, candidate images that contain text may be discarded. Candidate images that look more like clip-art, as opposed to photographs, may be discarded. Candidate images that are all the same color may be discarded. Other criteria may alternatively be used to filter out bad images.

The best document level image may be selected as the highest scoring candidate image of the remaining candidate images associated with a news document.

The best cluster level image may then be selected (act 460). A cluster is a collection of news documents relating to the same topic. Within a cluster, there might be multiple news documents that include images. According to one implementation, the best cluster level image may be determined based on the rank of the source news document within the cluster. For example, the higher the news document is ranked within the cluster, the more likely its image may be representative of the cluster.

The best cluster level image may also, or alternatively, be determined based on an overlap of an image caption and the cluster centroid. For example, it may be determined how many times the words in the image caption appear in the body of the documents in the cluster. The more hits the image caption has in the body of the documents, the more likely that the image is related to the topic of the cluster.

In one implementation, the rank of the source news document may be one factor and the amount of overlap between the image caption and cluster centroid may be another factor in generating an overall score for an image. In other implementations, one of these factors may be weighted more heavily than the other. In yet other implementations, other factors may also be considered in generating the overall score.

Exemplary Query Processing

FIG. 6 is a flowchart of exemplary processing for providing search results according to an implementation consistent with the principles of the invention. Processing may begin with receiving a search query from a user (act 610). For example, a user may use conventional web browser software to access a search engine, such as search engine 125 of server 120 (FIG. 1). The user may then enter the search query via a graphical user interface provided by search engine 125. Assume that the search query includes a term relating to a news search.

A search may then be performed to identify news documents that are relevant to the search query (act 620). For example, a corpus or repository of news documents may be examined to identify news documents that include a term of the search query. The news documents may then be ranked according to one or more conventional ranking factors.

It may then be determined whether to present the search results as a list of news documents or as a list of clusters of news documents (act 630). This determination may be pre-established by search engine 125. For example, the search results may always initially be presented as a list of news documents or a list of clusters. The user may then be given the option of having the search results presented another way. Alternatively, the user may initially be given the option of specifying how the search results will be presented.

If the search results are to be presented as a list of clusters, the news documents (of the search results) may be formed into one or more clusters according to the topics to which they relate (act 640). Techniques for forming related documents into clusters are known in the art and, therefore, will not be discussed further. The clusters may then be ranked according to one or more conventional ranking factors. Images for the clusters may then be determined (act 650), as described above. If the search results are to be presented as a list of documents, images for the documents may be determined (act 660), as also described above.

The search results may then be presented to the user via a graphical user interface (act 670). For example, the search results may be presented as a list of links to news documents with their associated images. Alternatively, the search results may be presented as a list of clusters of news documents with their associated images.

Exemplary Graphical User Interfaces

FIG. 7 is a diagram of an exemplary graphical user interface that presents search results as a list of clusters according to an implementation consistent with the principles of the invention. As shown in FIG. 7, a user may enter a search query via a graphical user interface associated with a search engine, such as search engine 125 (FIG. 1). In this example, the user enters the search query "bush."

Search engine 125 may perform a search of a repository or corpus for news documents that are relevant to the search query. There are many ways to determine document relevancy. For example, documents that contain one or more of the search terms of the search query may be identified as relevant. Documents that include a greater number of the search terms may be identified as more relevant than documents that include a fewer number of the search terms.

Search engine 125 may then present the relevant news documents to the user as clusters. As shown in FIG. 7, each cluster may include a link 710 to a corresponding news document, a news source identifier along with an indicator of when the document was created 720, and a brief description 730 of the corresponding document. The cluster may also include links 740 to other documents in the cluster that are related to a topic of the document associated with link 710.

As further shown in FIG. 7, an image 750 may be presented alongside the cluster. Image 750 may be identified, as described above, and presented with an optional descriptor 760 of the source of image 750. In the example of FIG. 7, descriptor 760 identifies CNN as the source of image 750. In one implementation, image 750 is a selectable object—meaning that the user may select the image and be directed to the source document (i.e., the document from which the image originated) or the domain associated with the news source (e.g., cnn.com).

Figure 8:
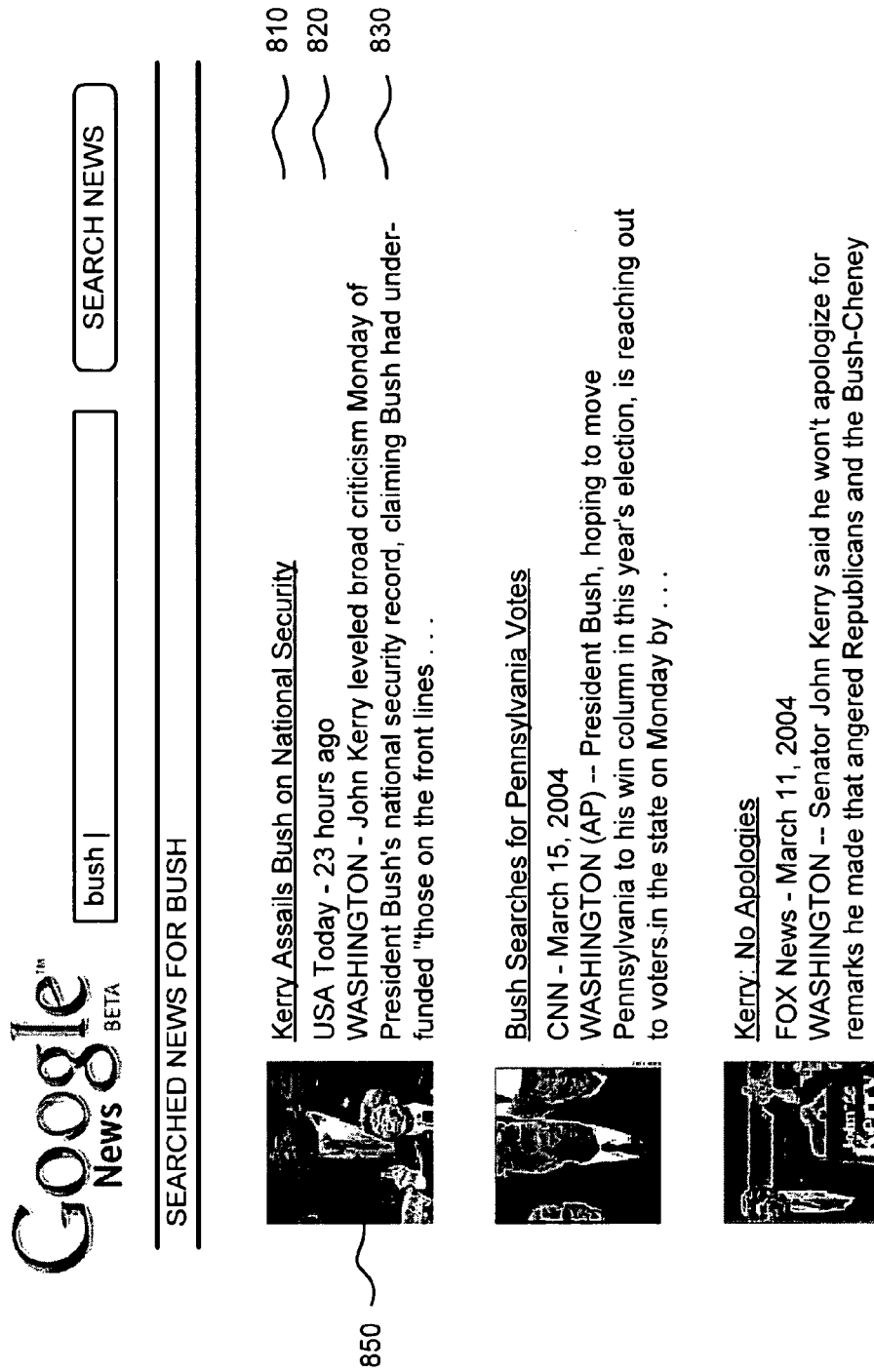
FIG. 8 is a diagram of an exemplary graphical user interface that presents search results as a list of documents according to an implementation consistent with the principles of the invention.

FIG. 8 is a diagram of an exemplary graphical user interface that presents search results as a list of documents according to an implementation consistent with the principles of the invention. As shown in FIG. 8, a user may enter a search query via a graphical user interface associated with a search engine, such as search engine 125 (FIG. 1). In this example, the user enters the search query "bush."

Search engine 125 may perform a search of a repository or corpus for news documents that are relevant to the search query. Search engine 125 may then present the relevant news documents to the user as a list of documents. As shown in FIG. 8, each search result may include a link 810 to a corresponding news document, a news source identifier along with an indicator of when the document was created 820, and a brief description 830 of the corresponding document.

As further shown in FIG. 8, an image 850 may be presented alongside the search result. Image 850 may be identified, as described above. In one implementation, image 850 is a selectable object—meaning that the user may select the image and be directed to the document associated with link 810 or the domain associated with the news source (e.g., usatoday.com).

CONCLUSION

Systems and methods consistent with the principles of the invention may present relevant images in association with news documents and clusters of news documents.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 4-6, the order of the acts may be modified in other implementations consistent with the principles of the invention. Further, non-dependent acts may be performed in parallel.

In one implementation, server 120 may perform most, if not all, of the acts described with regard to the processing of FIGS. 4-6. In another implementation consistent with the principles of the invention, one or more, or all, of the acts may be performed by another entity, such as another server 130 and/or 140 or client 110.

Further, while described in the context of news searches, systems and methods consistent with the principles of the invention may be applicable to non-news searches, such as product searches.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    identifying, by one or more processors, a caption associated with an image included in a document in a cluster of documents;
    generating, by one or more processors, a first score for the image based on a size of the image;
    generating, by the one or more processors, a second score for the image based on a distance between the image and a title of the document;
    generating, by the one or more processors, a third score for the image based on the caption associated with the image;
    generating, by the one or more processors, an overall score for the image based on the first score, the second score, and the third score;
    identifying, by one or more processors, the image for being representative of the cluster based on the overall score; and
    associating, by one or more processors, the image with the cluster as being a representative image of the cluster.

2. The method of claim 1, where identifying the image for being representative of the cluster comprises:
    selecting the image based on the overall score and a rank associated with the document,
    the rank being a rank of the document within the cluster.

3. The method of claim 1, further comprising:
    receiving a search query;
    generating a list of search results based on the search query,
        the list of search results including information regarding documents in the cluster, and
        the documents including the document that includes the image;
    generating a search result document that includes the list of search results,
        the search result document presenting the representative image with the information regarding the documents in the cluster; and
    outputting the search result document.

4. A method comprising:
    identifying, by one or more processors, a caption associated with an image included in a document in a cluster of documents;
    determining, by the one or more processors, a quantity of times that words in the caption appear in a body of the document;
    determining, by the one or more processors, a first factor for the image based on one of a size of the image or a distance between the image and a title of the document;
    determining, by the one or more processors, a second factor for the image based on the quantity of times that words in the caption appear in the body of the document;
    determining, by the one or more processors, a score for the image based on the first factor and the second factor;
    selecting, by the one or more processors, the image as a representative image for the cluster based on the score; and
    associating, by one or more processors, the representative image with the cluster.

5. The method of claim 4,
    where the document includes a plurality of images,
    where the plurality of images include the representative image, and
    where the method further comprises:
        filtering the plurality of images to eliminate one or more images, of the plurality of images, from being selected as the representative image for the cluster.

6. The method of claim 5, where filtering the plurality of images comprises:
    identifying a particular image, of the plurality of images, as having an irregular shape, and
    discarding the particular image.

7. The method of claim 5, where filtering the plurality of images comprises:
    determining whether a dimension of a particular image, of the plurality of images, is below a threshold, and
    discarding the particular image when the dimension of the particular image is below the threshold.

8. The method of claim 5, where filtering the plurality of images comprises:
    determining an aspect ratio of a particular image of the plurality of images, and
    discarding the particular image when the aspect ratio is below a threshold.

9. The method of claim 5, where filtering the plurality of images comprises:
    determining whether a file format for a particular image of the plurality of images comprises a particular image file format, and
    discarding the particular image when the file format for the particular image is not the particular image file format.

10. The method of claim 5, where filtering the plurality of images comprises:
    determining whether a particular image of the plurality of images includes a link, and
    discarding the particular image when the particular image includes a link.

11. The method of claim 5, where filtering the plurality of images comprises:
    determining a host associated with a particular image of the plurality of images,
    determining a host associated with the document, and
    discarding the particular image when the host associated with the particular image differs from the host associated with the document.

12. The method of claim 4, where identifying the caption comprises:
    determining whether alternative text is available for the image, and
    using the alternative text as the caption for the image when the alternative text is available.

13. The method of claim 12, where using the alternative text as the caption for the image comprises:
    determining whether the alternative text is related to a topic of the document, and using the alternative text as the caption when the alternative text is related to the topic of the document.

14. The method of claim 4, where identifying the caption comprises:
  determining that the image is located within a table of the document,
  identifying text within the table, and
  using the identified text as the caption.

15. The method of claim 4, where identifying the caption comprises:
  determining that the image is located within a table of the document,
  identifying text within a certain distance of the table, and
  using the identified text as the caption.

16. The method of claim 4, where determining the first factor for the image comprises:
  determining the first factor for the image based on a distance between the image and a title of the document.

17. The method of claim 4, where selecting the image as the representative image for the cluster comprises:
  selecting the image based on the score and a rank associated with the document,
  the rank being a rank of the document within the cluster.

18. The method of claim 4, where the document comprises a news document.

19. A system comprising:
  one or more computer devices to:
    identify a caption associated with an image included in a document in a cluster of documents;
    determine a quantity of times that words in the caption appear in a body of the document;
    determine a first factor for the image based on the quantity of times that words in the caption appear in the body of the document;
    determine a second factor for the image based on one of a size of the image or a distance between the image and a title of the document;
    determine a score for the image based on the first factor and the second factor;
    select the image as a representative image for the cluster based on the score; and
    associate the representative image with the cluster.

20. The system of claim 19, where, when determining the score for the image, the one or more computer devices are to:
  determine a third factor for the image based on a rank associated with the document,
  determine the score for the image based on the first factor, the second factor, and the third factor.

21. A method, comprising:
  identifying, by one or more processors, a first plurality of images;
  determining, by the one or more processors and for a particular image of the first plurality of images, a count that indicates a number of times the particular image is linked to documents associated with a particular host;
  discarding, by the one or more processors and based on the determined count, the particular image to create a second plurality of images;
  detecting, by the one or more processors, captions associated with the second plurality of images;
  selecting, by the one or more processors, an image, of the second plurality of images, to associate with a document based on the detected captions; and
  associating, by the one or more processors, the selected image with the document.

22. The method of claim 21, where discarding the particular image comprises:
  determining that the count for the particular image exceeds a threshold, and
  discarding the particular image when the count exceeds the threshold.

23. The method of claim 21, where discarding the particular image comprises:
  determining an aspect ratio associated with the particular image, and
  discarding the particular image when the aspect ratio exceeds an aspect ratio threshold.

24. A computer device, comprising:
  a processor to:
    identify a plurality of images associated with a document,
    determine a host associated with the document,
    detect captions associated with the plurality of images,
    identify an image, of the plurality of images, that is linked to by multiple other documents associated with the host and that has a caption that is unrelated to topics of the multiple other documents,
    discard the identified image to create a plurality of remaining images,
    select a remaining image, of the plurality of remaining images, to link with the document based on the detected captions, and
    link the selected remaining image with the document.

25. The computer device of claim 24, where, when selecting the remaining image of the plurality of remaining images, the processor is to:
  generate an image score for each remaining image, of the plurality of remaining images, based on a factor of a plurality of factors,
    the plurality of factors comprising:
      a size of the remaining image,
      a distance between the remaining image and a title of the document, and
      a measure of relatedness between a detected caption associated with the remaining image and a topic of the document, and
  select the remaining image based on the image score generated for each remaining image of the plurality of remaining images.

26. The computer device of claim 24, where, when detecting the captions, the processor is to:
  determine that alternative text is available for a particular image of the plurality of images,
  determine that the alternative text is related to a topic of the document, and
  use the alternative text as a caption for the particular image when the alternative text is related to the topic of the document.

27. A computer-readable memory device including computer-executable instructions, the computer-executable instructions comprising:
  one or more instructions which, when executed by one or more processors, cause the one or more processors to identify a plurality of images;
  one or more instructions which, when executed by the one or more processors, cause the one or more processors to determine a count associated with a particular image of the plurality of images,
    the count indicating a number of times the particular image is linked to documents associated with a particular host;
  one or more instructions which, when executed by the one or more processors, cause the one or more processors to discard the particular candidate image, based on the determined count, to create a plurality of remaining images;

one or more instructions which, when executed by the one or more processors, cause the one or more processors to detect captions associated with the plurality of remaining images;

one or more instructions which, when executed by the one or more processors, cause the one or more processors to select an image, of the plurality of remaining images, to associate with a document based on the detected captions; and one or more instructions which, when executed by the one or more processors, cause the one or more processors to associate the selected image with the document in a memory.

28. The computer-readable memory device of claim 27, where the one or more instructions to discard the particular image comprises:

one or more instructions to determine that the count for the particular image exceeds a threshold, and one or more instructions to discard the particular image when the count exceeds the threshold.

29. A computer-readable memory device including computer-executable instructions, the computer-executable instructions comprising:

one or more instructions which, when executed by one or more processors, cause the one or more processors to identify a plurality of images associated with a document;

one or more instructions which, when executed by the one or more processors, cause the one or more processors to determine a host associated with the document;

one or more instructions which, when executed by the one or more processors, cause the one or more processors to detect captions associated with the plurality of images;

one or more instructions which, when executed by the one or more processors, cause the one or more processors to identify an image, of the plurality of images, that is linked to by multiple other documents associated with the host and that has a caption that is unrelated to topics of the multiple other documents;

one or more instructions which, when executed by the one or more processors, cause the one or more processors to discard the identified image to create a plurality of remaining images;

one or more instructions which, when executed by the one or more processors, cause the one or more processors to select an image of the plurality of remaining images to link with the document based on the detected captions; and one or more instructions which, when executed by the one or more processors, cause the one or more processors to link the selected image with the document.

30. The computer-readable memory device of claim 29, where the one or more instructions to detect captions associated with the plurality of images include:

one or more instructions to determine that a particular image, of the plurality of images, is located within a table of the document, one or more instructions to identify text within the table, and one or more instructions to use the identified text as the caption for the particular image.

31. The computer-readable memory device of claim 29, where the one or more instructions to detect captions associated with the plurality of images include:

one or more instructions to determine that a particular image, of the plurality of images, is located within a table of the document, one or more instructions to identify text within a certain distance of the table, and one or more instructions to use the identified text as the caption for the particular image.

32. The method of claim 1, further comprising:

forming the cluster of documents, where documents, of the cluster of documents, are related to a same topic.

33. The method of claim 1, where generating the third score for the image comprises:

determining a quantity of words in the caption associated with the image, and generating the third score for the image based on the quantity of words.

34. The method of claim 1, where the document includes a plurality of images, where the plurality of images include the representative image, and where the method further comprises:

filtering the plurality of images to eliminate one or more images, of the plurality of images, from being selected as the representative image.

35. The system of claim 19, where the one or more computer devices are further to form the cluster of documents, and where documents, of the cluster of documents, are related to a same topic.

36. The system of claim 19, where the document includes a plurality of images, where the plurality of images include the representative image and one or more other images, where the one or more computer devices are further to:

filter the plurality of images to eliminate the one or more other images from being selected as the representative image, and where, when filtering the plurality of images, the one or more computer devices are to at least one of:

discard a first image, of the one or more other images, based on the first image having a particular file format, or discard a second image, of the one or more other images, based on the second image including a link.

\* \* \* \* \*